US008892782B1

(12) United States Patent
Cronin (10) Patent No.: US 8,892,782 B1
(45) Date of Patent: Nov. 18, 2014

(54) SYSTEM FOR AND METHOD OF TRANSLATING MOTION-BASED USER INPUT BETWEEN A CLIENT DEVICE AND AN APPLICATION HOST COMPUTER (71) Applicant: hopTo Inc., Campbell, CA (US)

(72) Inventor: John Cronin, Williston, VT (US)

(73) Assignee: hopTo Inc., Campbell, CA (US)

( * ) Notice: Subject to any disclaimer, the term of this patent is extended or adjusted under 35 U.S.C. 154(b) by 0 days.

(21) Appl. No.: 14/248,505

(22) Filed: Apr. 9, 2014

Related U.S. Application Data (63) Continuation of application No. 13/481,750, filed on May 25, 2012, now Pat. No. 8,738,814.

(51) Int. Cl.
G06F 3/06 (2006.01)
G06F 3/0354 (2013.01)
G06F 3/023 (2006.01)
G06F 3/01 (2006.01)
G06F 3/041 (2006.01)
G06F 13/00 (2006.01)

(52) U.S. Cl.
CPC ............ *G06F 3/041* (2013.01); *G06F 3/03543* (2013.01); *G06F 3/023* (2013.01); *G06F 3/017* (2013.01)
USPC ............. 710/5; 710/2; 710/8; 710/15; 710/32

(58) Field of Classification Search
None
See application file for complete search history.

(56) References Cited

U.S. PATENT DOCUMENTS

| 6,205,508 | B1 | 3/2001 | Bailey et al. |
| 6,525,716 | B1 | 2/2003 | Makino |
| 6,615,252 | B1 | 9/2003 | Oka et al. |
| 8,738,814 | B1 | 5/2014 | Cronin |
| 8,745,280 | B1 | 6/2014 | Cronin |
| 2005/0147301 | A1 | 7/2005 | Wang et al. |
| 2008/0267447 | A1 | 10/2008 | Kelusky et al. |
| 2009/0013092 | A1 | 1/2009 | Pao et al. |
| 2010/0073497 | A1 | 3/2010 | Katsumata et al. |
| 2011/0047231 | A1 | 2/2011 | Lim et al. |
| 2011/0134033 | A1* | 6/2011 | Raynor .......................... 345/157 |
| 2011/0314093 | A1 | 12/2011 | Sheu et al. |
| 2012/0019522 | A1* | 1/2012 | Lawrence et al. ............. 345/419 |
| 2012/0089921 | A1* | 4/2012 | Bellini .......................... 715/740 |
| 2012/0293406 | A1 | 11/2012 | Park et al. |

OTHER PUBLICATIONS

U.S. Appl. No. 13/475,926 Final Office Action mailed Mar. 20, 2014.
U.S. Appl. No. 13/475,926 Office Action mailed Oct. 4, 2013.

(Continued)

*Primary Examiner* — Scott Sun
(74) *Attorney, Agent, or Firm* — Lewis Roca Rothgerber LLP (57) ABSTRACT A system that translates motion-based user input between a client device and an application host computer. In various embodiments, the system and methods enable an application host computer, application server, or cloud server that supports a first type of input/output (I/O) devices (e.g., mouse, keyboard, and display) to interpret I/O commands from a client device that supports a second type of I/O devices (e.g., touchscreen display), wherein the I/O commands of the client device support motion-based user input. The operations of the interpreted I/O commands are then returned from the application host computer, application server, or cloud server to the client device and rendered on the display thereof. The system and methods enable cross-platform application execution by translating I/O operations that are native to the user's remote device to I/O operations that are native to the application host computer, application server, or cloud server.

19 Claims, 5 Drawing Sheets

(56) References Cited

OTHER PUBLICATIONS

U.S. Appl. No. 13/481,748 Final Office Action mailed Mar. 26, 2014.
U.S. Appl. No. 13/481,748 Office Action mailed Sep. 9, 2013.
U.S. Appl. No. 13/481,749 Office Action mailed Aug. 28, 2013.
U.S. Appl. No. 13/481,750 Office Action mailed Aug. 28, 2013.

* cited by examiner

SYSTEM FOR AND METHOD OF TRANSLATING MOTION-BASED USER INPUT BETWEEN A CLIENT DEVICE AND AN APPLICATION HOST COMPUTER

CROSS-REFERENCE TO RELATED APPLICATIONS

The present application is a continuation and claims the priority benefit of U.S. patent application Ser. No. 13/481,750 filed May 25, 2012, the disclosure of which is incorporated herein by reference.

TECHNICAL FIELD

The present disclosure relates generally to processing computer input/output operations, and more particularly to a system for and method of translating motion-based user input between a client device and an application host computer.

BACKGROUND

Many different types of computing devices exist today. Many computing devices use traditional input/output (I/O) devices (e.g., mouse, keyboard, and display). However, there are many computing devices that do not use traditional I/O devices. For example, more and more handheld computing devices, such as mobile phones (e.g., Android™ Phone and iPhone), personal digital assistants (PDAs) (e.g., Blackberry®), and tablet devices (e.g., iPad and Samsung Galaxy Tab), are relying on touchscreen technology as the primary mechanism by which users interact with the device. In a remote access system in which a user uses a remote device, such as the aforementioned handheld computing devices, to access resources of an application host computer, application server, or cloud server, there may be certain limitations due to incompatibility of I/O devices between the user's remote access device and the application host computer, application server, or cloud server. For example, the operating system of the application host computer, application server, or cloud server, which is designed to process mouse clicks and keystrokes, may be unable to interpret certain touchscreen gestures (e.g., finger taps, finger swipes, finger pinches, etc) that are used with the operating system of the user's remote access device.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a networked computing system for and method of translating motion-based user input between a client device and an application host computer. The networked computing system of the disclosure exhibits numerous advantages over existing systems. In various embodiments, the networked computing system of the disclosure and associated methods enable an application host computer, application server, or cloud server that supports a first type of I/O devices (e.g., mouse, keyboard, and display) to interpret I/O commands from a client device that supports a second type of I/O devices (e.g., touchscreen display) that further support motion-based user input. The operations of the interpreted I/O commands are then returned from the application host computer, application server, or cloud server to the client device and rendered on the display thereof. This enables cross-platform application execution by translating I/O operations that are native to the user's remote device to I/O operations that are native to the application host computer, application server, or cloud server.

Figure 1:
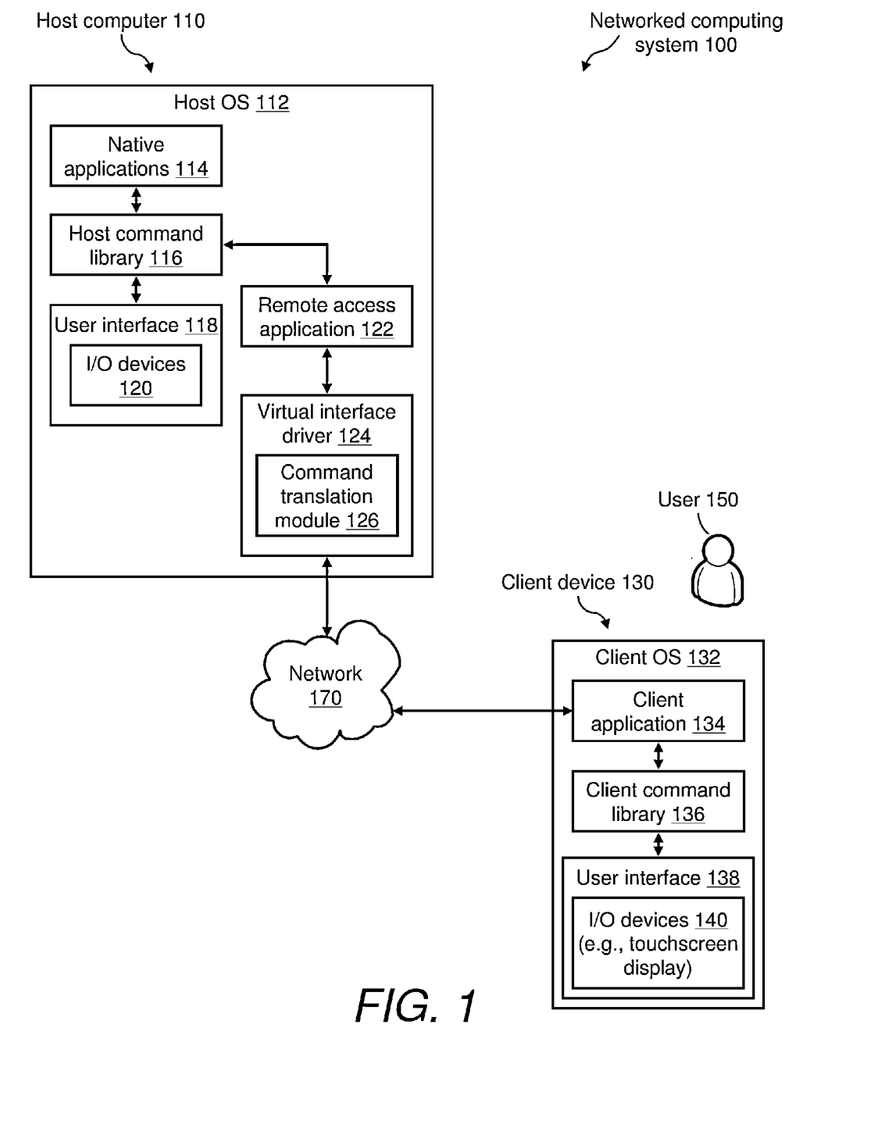
FIG. 1 illustrates a block diagram of a networked computing system for translating motion-based user input between a client device and an application host computer, according to the present disclosure.

FIG. 1 illustrates a block diagram of a networked computing system 100 for translating motion-based user input between a client device and an application host computer. Networked computing system 100 includes a host computer 110 that is operatively connected to a client device 130 via a network 170. Network 170 may be, for example, a local area network (LAN) and/or a wide area network (WAN) for connecting to the Internet. Entities of networked computing system 100 may connect to network 170 by any wired and/or wireless means. Networked computing system 100 is not limited to one host computer 110 and one client device 130. Any number of host computers 110 and client devices 130 may exist in networked computing system 100.

Host computer 110 is running a certain host operating system (OS) 112 and includes one or more native applications 114, a host command library 116, and a user interface 118 for processing I/O operations of I/O devices 120. Host computer 110 also includes a remote access application 122 and a virtual interface driver 124 that further includes a command translation module 126. Client device 130 is running a certain client OS 132 and includes a client application 134, a client command library 136, and a user interface 138 for processing I/O operations of I/O devices 140. Collectively, these elements function to enable client device 130 and the client user (e.g., a user 150) to consume resources or services, such as native applications 114, provided by host computer 110.

In accordance with the client-server model or cloud computing model of computing, remote access application 122 functions to enable host computer 110 to provide various resources or services to client device 130, which may be located remotely from host computer 110. In accordance with the present disclosure, these resources or services pertain to any native applications 114 of host computer 110.

Host computer 110 may be any computer that may be accessed remotely by client device 130 via network 170. In one example, host computer 110 may be an application server or cloud server to which remote access to its resources or services (e.g., native applications 114) is provided as a service to user 150 who is using client device 130. In another example, host computer 110 may be any computer capable of hosting resources or services (e.g., native applications 114). For example, host computer 110 may be another computer, such as a desktop or laptop computer, that belongs to user 150. Client device 130 may be any computing device that is capable of connecting to host computer 110 via network 170. Client device 130 may be used by user 150 to remotely access resources or services (e.g., native applications 114) of host computer 110 that are not otherwise installed on the client device 130 itself.

Further to the example, host computer 110 supports a first type of I/O devices 120, such as a mouse, keyboard, and display. Command translation module 126 of host computer 110 is used to interpret I/O commands from client device 130, wherein client device 130 supports a second type of I/O devices 140 that use motion-based user input, such as finger gestures on a touchscreen display. This scenario enables cross-platform application execution by translating I/O operations that are native to client device 130 to I/O operations that are native to host computer 110. In one example, host OS 112 of host computer 110 may be the Windows, Linux, UNIX, or Mac OS X operating system, while the client OS 132 of client device 130 may be the iOS from Apple Inc. (Cupertino, Calif.), the Android OS from Google Inc. (Mountain View, Calif.), or any mobile OS, such as the BlackBerry OS from Research In Motion (RIM) (Waterloo, Ontario, Canada).

Native applications 114 represent any applications installed on host computer 110. For example, native applications 114 may include any Microsoft® Office products, such as Word, Excel, PowerPoint, Outlook, Access, and Publisher; any other document editing and/or viewing applications; a computer-aided design (CAD) application, such as AutoCAD (Autodesk, Inc., San Rafael, Calif., USA) or Cadence Virtuoso (Cadence Design Systems, San Jose, Calif.); and the like. The functionality of native applications 114 shall be visible to and accessible by client device 130 via network 170. For example, the functionality of native applications 114 may be accessed from client device 130 using the combination of remote access application 122 of host computer 110 and client application 134 of client device 130.

Remote access application 122 is the application or process that manages the user access process at the host computer 110 whenever a request is received from a client device 130 via network 170 to access a certain native application 114. Namely, remote access application 122 provides an application publishing service, which is used to publish its native applications 114 to users 150. For example, remote access application 122 is capable of starting a remote session in which native applications 114 can be run and displayed to user 150 at his/her client device 130, which is a remote device. Remote access application 122 manages the communication of host computer 110 with the client device 130 with respect to creating and displaying host sessions on behalf of users 150.

Further, remote access application 122 provides the interface between client device 130 and host computer 110. Remote access application 122 is capable of starting a remote session in which native applications 114 can be run and displayed to user 150 at his/her client device 130, which is a remote device. More particularly, under the control of remote access application 122, native applications 114 of host computer 110 shall be visible to and accessible by client devices 130 via network 170. For example, user 150 authenticates to host computer 110 using remote access application 122. Once authenticated, user 150 is allowed access to native applications 114 of host computer 110.

Client application 134 of client device 130 is used to provide a user interface to host computer 110. Namely, client application 134 is the component that is the counterpart to remote access application 122 of host computer 110. Client application 134 may be implemented as a web application and run in a web browser, such as Internet Explorer. However, client application 134 may be implemented by other means, such as a .NET application, a light weight desktop application, a mobile app, and the like.

Host command library 116 of host computer 110 is a library of OS-specific I/O commands that support user interface 118 and I/O devices 120. For example, if host computer 110 is a Windows computer, host command library 116 is a library of Windows-specific I/O commands that may support, among other things, a mouse, a keyboard, and a display. Similarly, client command library 136 of client device 130 is a library of OS-specific I/O commands that support user interface 138 and I/O devices 140. For example, if client device 130 is an iPad, client command library 136 is a library of iOS-specific I/O commands that may support, among other things, finger gestures on a touchscreen display.

Various embodiments of this disclosure are directed towards enabling I/O commands from one library type (e.g., iOS-specific) to be realized using equivalent I/O commands from another library type (e.g., Windows-specific). This is advantageous as it does not force host computer 110 and client device 130 to adhere to a single common library, rather it lets each entity implement the most appropriate library for the device.

Virtual interface driver 124 is a software code module that processes commands or functions that are exchanged between host computer 110 and client device 130 over network 170. Virtual interface driver 124 includes command translation module 126 that translates I/O commands from one type of command to another such that the original command can be executed on client device 130. For example, command translation module 126 may convert iOS-specific I/O commands, which support motion-based user input, into one or more Windows-specific I/O command(s), the execution of which may be transmitted to client device 130 for rendering.

User interface 138 of client device 130 receives and processes I/O information, such as I/O command(s), from host computer 110 via client application 134. For example, if I/O devices 140 of user interface 138 include a touchscreen display, user interface 138 receives data from host computer 110 via client application 134 and renders the I/O command(s) on the touchscreen display.

Table 1 shows an example of the I/O command translation that is performed by command translation module 126 of host computer 110. In this example, client command library 136 supports iPad motion-based user input (i.e., finger gestures) on a touchscreen display, which are translated into Windows I/O operations that are supported by host command library 116. The translation is performed by command translation module 126 whenever client device 130, which is an iPad, accesses and uses a certain native application 114 of host computer 110, which is a Windows computer. Namely, the interface of a selected native application 114 of host computer 110 is "remoted" to client device 130 and displayed to user 150 on, for example, a touchscreen display. Then, user 150 interacts with the selected native application 114 using finger gestures that are interpreted using client command library 136. The I/O commands corresponding to user 150's finger gestures are transmitted from client command library 136 to host computer 110 through client application 134. Because these motion-based I/O commands are not I/O commands that are native to host computer 110, command translation module 126 is used to translate the motion-based I/O command(s) from client device 130 to its native I/O command(s), e.g., Windows-based I/O command(s), which are supported by host command library 116. In one example, the translation is performed according to Table 1. Host computer 110 processes the translated I/O command and performs the corresponding I/O operation. The result of the I/O operation is then transmitted from virtual interface driver 124 of host computer 110 to client application 134 of client device 130. The resulting I/O operation is then passed to user interface 138 of client device 130 and rendered on the touchscreen display. More details of examples of methods of translating motion-based user input between client device 130 and host computer 110 are described with reference to FIGS. 2, 3, and 4.

TABLE 1

Example I/O command translation of command translation module 126

| Command translation module 126 input: iPad finger gestures supported by client command library 136 | Function | Command translation module 126 output: Corresponding Windows I/O operations supported by host command library 116 |
|---|---|---|
| Single tap | Selects an object, usually a button. | Mouse point and click |
| Double-tap | Zoom in on text or images | Cntrl & Mouse scroll-wheel |
| One finger swipe | Scroll up and down in lists and tables. | Scroll-wheel |
| Two finger pinch | Zoom out on an image or view | Cntrl & Mouse scroll-wheel |
| Two finger spread (or reverse pinch) | Zoom in on an image or view | Cntrl & Mouse scroll-wheel |
| Two finger scroll | A 2-D scroll around a window | Scroll bars on the side and bottom of window pane |
| Two finger rotate (where the thumb remains in one place and the index finger rotates around it) | Rotating images | Menu selection |
| Two finger swipe | Switch between web pages | Mouse click on browser tab |
| Spread three fingers away from thumb | Move all open windows off the screen to show the desktop | Minimize all active window panes by mouse click on the minimize ("-") button |
| Four- or five-finger swipe up | Reveals the multi-tasking bar along the bottom of the screen | Bottom bar is always visible |
| Four- or five-finger horizontal swipe | Moves between your most recently used apps | Mouse click on app icon (after mouse click(s) on minimize button) |
| Thumb in the middle and moving three or more fingers towards it | Activate app menu (e.g. "Launchpad") | Mouse click on app icon (after mouse click(s) on minimize and/or close button(s) on the active app(s)) |
| Four- or Five-Finger Pinch | Return to the home screen | Mouse click(s) on minimize and/or close button(s) on the active app(s) |

Referring to Table 1, the Windows I/O operations that correspond to a particular iPad finger gesture are not limited to only those shown in Table 1. Namely, for any particular iPad finger gesture, multiple other Windows I/O operations may exist that are not shown in Table 1. For example, a particular iPad finger gesture may be accomplished in Windows in multiple ways, such as using any graphical user interface controls (e.g., pushbuttons, dropdown menus, slider bars), mouse point and click actions, mouse wheel actions, keyboard keystrokes, hot keys, and the like. In one example, there are multiple Windows I/O operations that correspond to the iPad one finger swipe gesture, which is scroll up and scroll down. Namely, a mouse click on a scroll bar, the mouse wheel itself, and the "Page up" and "Page down" keys on a keyboard may be used in a Windows environment to scroll up and down. In this example, any one of the three Windows I/O commands may be used by command translation module 126 as the translation of the iPad one finger swipe gesture.

Figure 2:
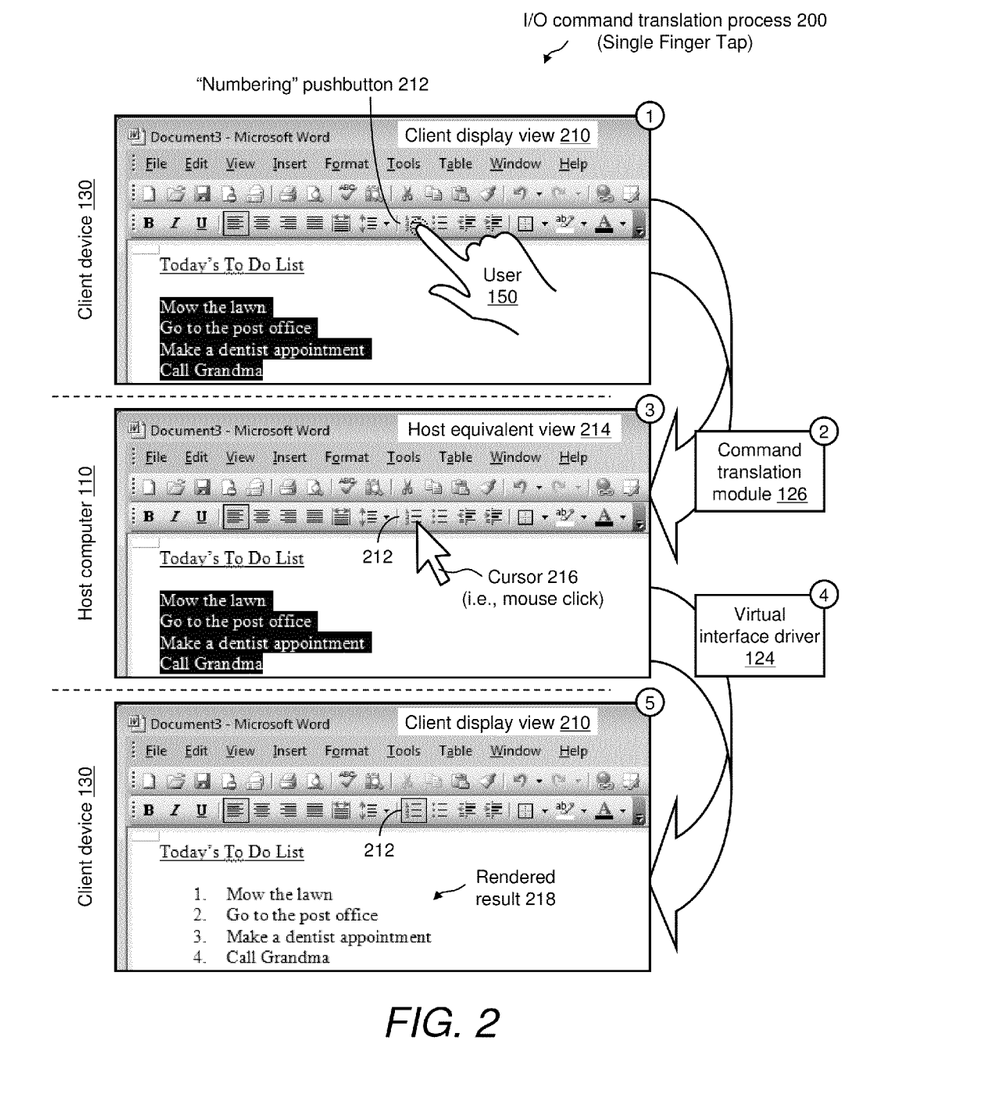
FIG. 2 illustrates an I/O command translation process of translating a single finger tap gesture, which is one example of motion-based user input, between a client device and an application host computer, according to the present disclosure.

FIG. 2 illustrates an I/O command translation process 200 of translating a single finger tap gesture (e.g., according to Table 1), which is one example of motion-based user input, between client device 130 and host computer 110 of networked computing system 100. In this example, the single finger tap gesture may be used to select an object, usually a button. In one example, according to Table 1, a mouse point and click is the Windows I/O operation that corresponds to the single finger tap gesture.

In the example shown in FIG. 2, the user 150 has selected Microsoft® Word from the available native applications 114 of host computer 110. Therefore, the Microsoft® Word interface is "remoted" from host computer 110 to client device 130 and displayed to user 150 on, for example, a touchscreen display of client device 130.

At a first step of I/O command translation process 200, user 150 interacts with the touchscreen display of client device 130, which is displaying Microsoft® Word, using motion-based finger gestures. For example, the Microsoft® Word interface is shown in a client display view 210 that is displayed on the touchscreen display of client device 130. In this step, user 150 is shown using a single finger tap on a "Numbering" pushbutton 212 to create a numbered list of certain lines of text that are selected. By conventional means, the size of the touchscreen display or window of client display view 210 at client device 130 is known. Therefore, the rendered locations of controls/pushbuttons/entry fields of the Microsoft® Word interface are known with respect to the touchscreen display or window that contains client display view 210. Client command library 136 recognizes the single finger tap at a touchscreen location that corresponds to the "Numbering" pushbutton 212 and client command library 136 transmits the corresponding I/O command(s) to host computer 110 through client application 134.

At a second step of I/O command translation process 200, because the motion-based I/O commands received from client device 130 are not I/O commands that are native to host computer 110, command translation module 126 is used to translate the single finger tap on the "Numbering" pushbutton 212 to native I/O command(s) of host computer 110, e.g., Windows-based I/O command(s), which are supported by host command library 116. For example, according to Table 1, the single finger tap at client device 130 corresponds to a mouse point and click at host computer 110.

At a third step of I/O command translation process 200, host computer 110 processes the translated I/O command and performs the corresponding I/O operation. For example, FIG. 2 shows a host equivalent view 214 (which is not actually rendered, but shown for illustration purposes only to simulate the equivalent operations at host computer 110). Host equivalent view 214 shows a cursor 216 positioned at the "Numbering" pushbutton 212 to illustrate that the single finger tap gesture is translated to a mouse point and click on the "Numbering" pushbutton 212.

At a fourth step of I/O command translation process 200, the resulting action of the mouse point and click on the "Numbering" pushbutton 212, which is to create a numbered list of the selected text, is transmitted from virtual interface driver 124 of host computer 110 to client application 134 of client device 130.

At a fifth step of I/O command translation process 200, the resulting I/O operation, which is to create a numbered list of the selected text, is passed to user interface 138 of client device 130 and rendered on the touchscreen display of client device 130. For example, FIG. 2 shows a rendered result 218 that shows a numbered list from what were previously unnumbered lines of text.

Figure 3:
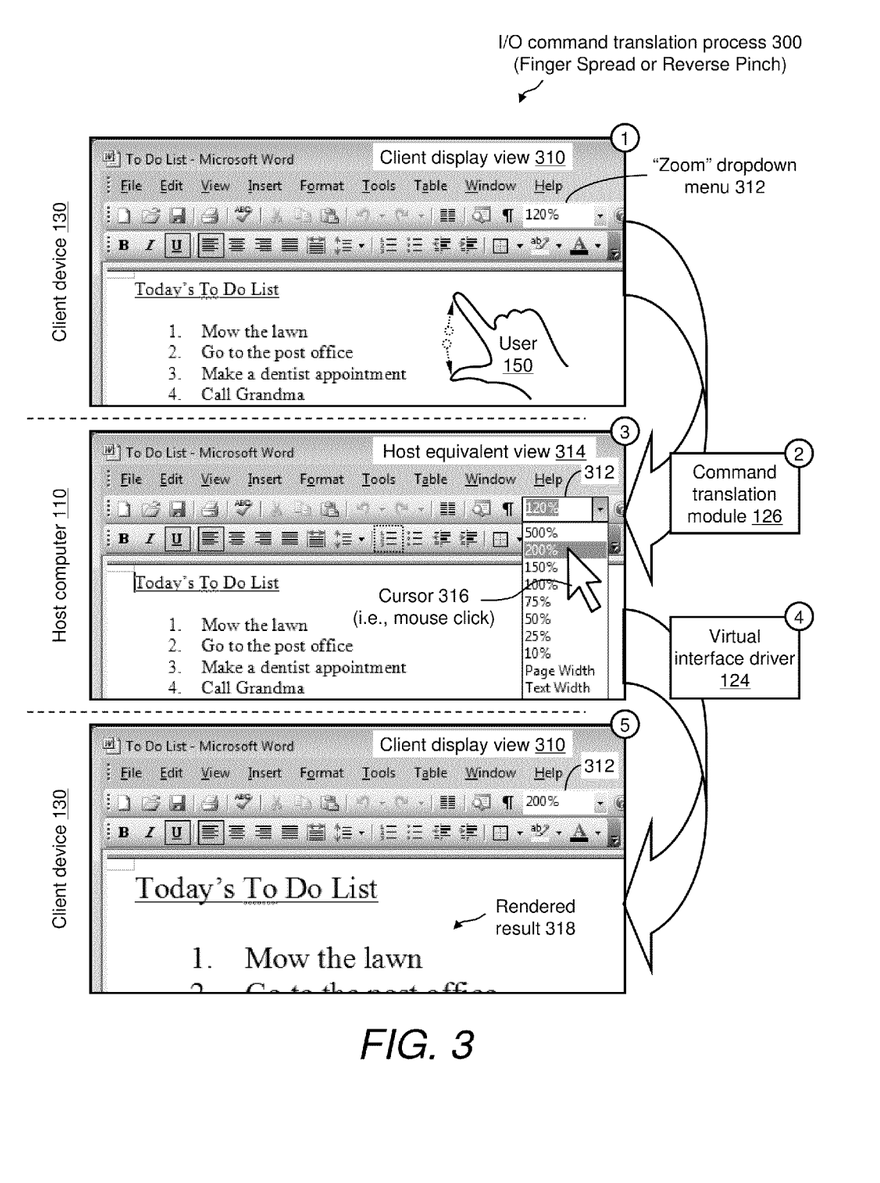
FIG. 3 illustrates an I/O command translation process of translating a two finger spread gesture, which is another example of motion-based user input, between a client device and an application host computer, according to the present disclosure.

FIG. 3 illustrates an I/O command translation process 300 of translating a two finger spread gesture (e.g., according to Table 1), which is another example of motion-based user input, between client device 130 and host computer 110 of networked computing system 100. In this example, the two finger spread gesture may be used to zoom in on an image or view, i.e., to increase the magnification. In one example, according to Table 1, pressing the Ctrl key while using the mouse scroll-wheel is the Windows I/O operation that corresponds to the two finger spread gesture. Additionally and not shown in Table 1, using a mouse point and click on a magnification dropdown menu of the selected native application 114 is another Windows I/O operation that corresponds to the two finger spread gesture. Translating the two finger spread gesture to a mouse point and click on a magnification dropdown menu is the example shown in I/O command translation process 300 of FIG. 3.

In the example shown in FIG. 3, the user 150 has selected Microsoft® Word from the available native applications 114 of host computer 110. Therefore, the Microsoft® Word interface is "remoted" from host computer 110 to client device 130 and displayed to user 150 on, for example, a touchscreen display of client device 130.

At a first step of I/O command translation process 300, user 150 interacts with the touchscreen display of client device 130, which is displaying Microsoft® Word, using motion-based finger gestures. For example, the Microsoft® Word interface is shown in a client display view 310 that is displayed on the touchscreen display of client device 130. In this step, user 150 is shown using a two finger spread at any portion of the viewing area of client display view 310 to increase the magnification of the viewing area. The degree of magnification may correspond to the degree of the two finger spread action that is detected at the touchscreen display. Client command library 136 recognizes the two finger spread at the viewing area of client display view 310 and client command library 136 transmits the corresponding I/O command (s) to host computer 110 through client application 134.

At a second step of I/O command translation process 300, because the motion-based I/O commands received from client device 130 are not I/O commands that are native to host computer 110, command translation module 126 is used to translate the two finger spread on the touchscreen display of client device 130 to its native I/O command(s), e.g., Windows-based I/O command(s), which are supported by host command library 116. For example, the two finger spread on the touchscreen display of client device 130 corresponds to a mouse point and click on a magnification dropdown menu of Microsoft® Word at host computer 110.

At a third step of I/O command translation process 300, host computer 110 processes the translated I/O command and performs the corresponding I/O operation. For example, FIG. 3 shows a host equivalent view 314 (which is not actually rendered, but shown for illustration purposes only to simulate the equivalent operations at host computer 110). Host equivalent view 314 shows a cursor 316 positioned at a "Zoom" dropdown menu 312 to illustrate that the two finger spread gesture is translated to a mouse point and click on the "Zoom" dropdown menu 312. Further, command translation module 126 translates the degree of the two finger spread to a certain degree of magnification. For example, command translation module 126 translates the degree of the two finger spread to the 200% magnification level of the "Zoom" dropdown menu 312.

At a fourth step of I/O command translation process 300, the resulting action of the mouse point and click on the "Zoom" dropdown menu 312, which is to increase the magnification of the viewing area, is transmitted from virtual interface driver 124 of host computer 110 to client application 134 of client device 130.

At a fifth step of I/O command translation process 300, the resulting I/O operation, which is to increase the magnification of the viewing area, is passed to user interface 138 of client device 130 and rendered on the touchscreen display of client device 130. For example, FIG. 3 shows a rendered result 318 that shows client display view 310 having a magnified viewing area.

Figure 4:
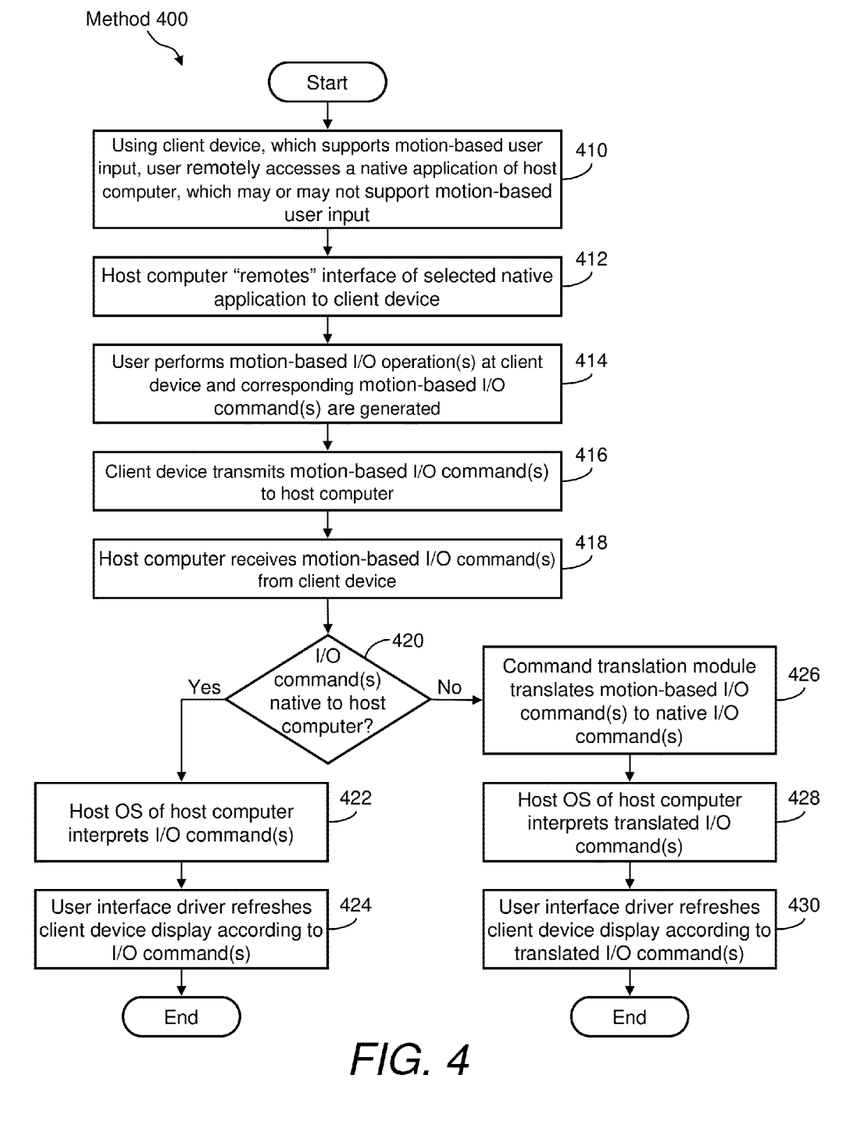
FIG. 4 illustrates a flow diagram of an example of a method of translating motion-based user input between a client device and an application host computer, according to the present disclosure.

FIG. 4 illustrates a flow diagram of an example of a method 400 of translating motion-based user input between client device 130 and host computer 110 of networked computing system 100. Method 400 may include, but is not limited to, the following steps.

At a step 410, using client device 130, which supports motion-based user input, user 150 remotely accesses a native application 114 of host computer 110, which may or may not support motion-based user input. For example, user 150 authenticates to remote access application 122 of host computer 110 using client application 134 of client device 130. Once authenticated, user 150 selects a certain native application 114 of host computer 110. In one example, user 150 selects Microsoft® Word from native applications 114 of host computer 110.

At a step 412, host computer 110 "remotes" the user interface of the selected native application 114 to client device 130. Continuing the example, host computer 110 "remotes" the Microsoft® Word interface to client device 130. Namely, the Microsoft® Word interface is transmitted from virtual interface driver 124 of host computer 110 to client application 134 of client device 130 via network 170. Then, the Microsoft® Word interface is displayed to user 150 on, for example, the touchscreen display of client device 130.

At a step 414, user 150 performs certain motion-based I/O operation(s) at client device 130 and the corresponding motion-based I/O command(s) are generated per client command library 136. For example, user 150 interacts with the touchscreen display of client device 130, which is displaying, for example, Microsoft® Word, using motion-based finger gestures, such as, but not limited to, the finger gestures shown in Table 1.

At a step 416, client device 130 transmits the motion-based I/O command(s) that are generated per client command library 136 to host computer 110 via network 170.

At a step 418, host computer 110 receives the motion-based I/O command(s) from client device 130.

At a decision step 420, virtual interface driver 124 analyzes the motion-based I/O command(s) received from client device 130 and determines whether the I/O command(s) are native to host OS 112 of host computer 110. If the I/O command(s) received from client device 130 are native to host computer 110, method 400 proceeds to step 422. However, if the I/O command(s) received from client device 130 are not native to host computer 110, then method 400 proceeds to step 426.

At a step 422, host OS 112 at host computer 110 interprets the I/O command(s) received from client device 130. The resulting action of the I/O command(s) is transmitted from virtual interface driver 124 of host computer 110 to client application 134 of client device 130.

At a step 424, user interface driver 138 refreshes the touchscreen display of client device 130 according to the I/O command(s). The I/O operation is passed to user interface 138 of client device 130 and rendered on the touchscreen display of client device 130.

At a step 426, command translation module 126 translates the motion-based I/O command(s) received from client device 130 to native I/O command(s) of host computer 110. For example, command translation module 126 translates the motion-based I/O command(s) supported by client command library 136 of client device 130 to native I/O command(s) supported by supported by host command library 116 of host computer 110, an example of which is shown in Table 1.

At a step 428, host OS 112 at host computer 110 interprets the translated I/O command(s) generated by command translation module 126. The resulting action of the translated I/O command(s) is transmitted from virtual interface driver 124 of host computer 110 to client application 134 of client device 130.

At a step 430, user interface driver 138 refreshes the touchscreen display of client device 130 according to the translated I/O command(s). The resulting I/O operation is passed to user interface 138 of client device 130 and rendered on the touchscreen display of client device 130.

Figure 5:
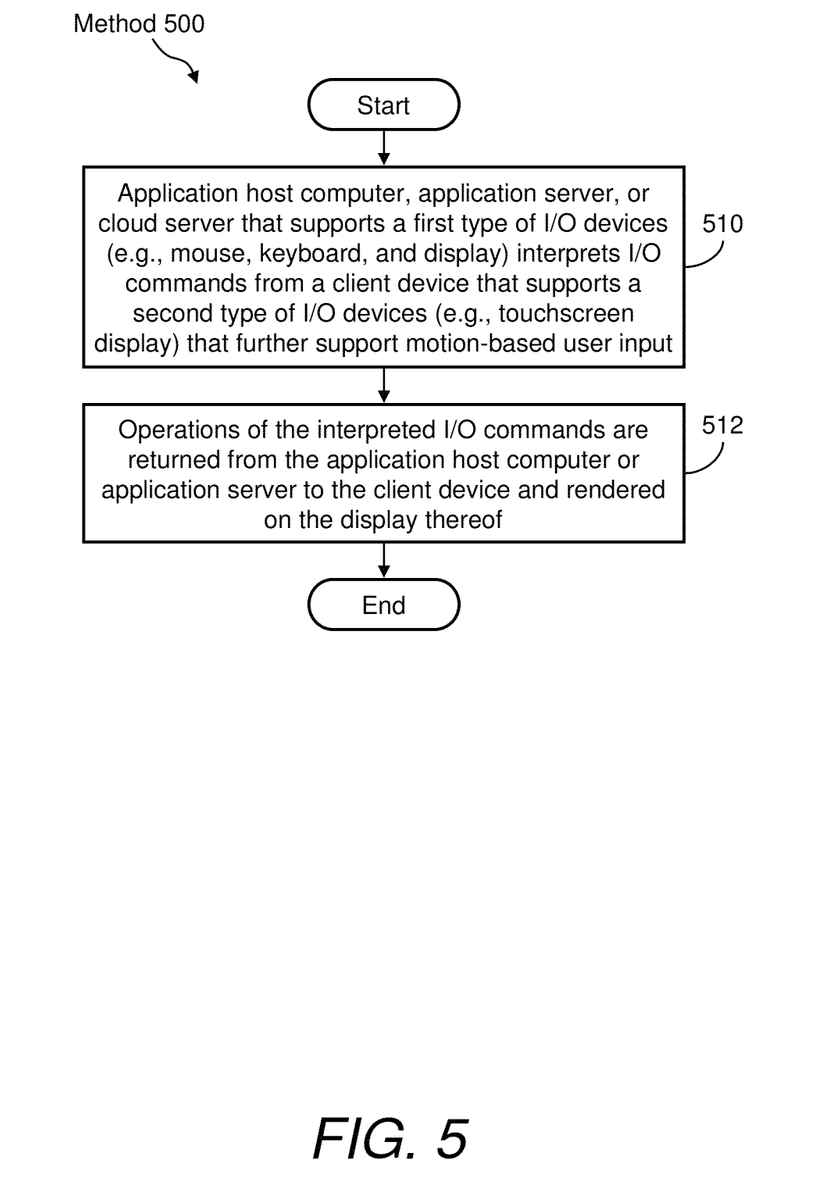
FIG. 5 illustrates an example of a flow diagram of a method of translating motion-based user input between a client device and an application host computer, according to a minimum configuration of the present disclosure.

FIG. 5 illustrates an example of a flow diagram of a method 500 of translating motion-based user input between client device 130 and host computer 110 of networked computing system 100, according to a minimum configuration of the present disclosure. Method 500 may include, but is not limited to, the following steps.

At a step 510, an application host computer, application server, or cloud server that supports a first type of I/O devices (e.g., mouse, keyboard, and display) interprets I/O commands from a client device that supports a second type of I/O devices (e.g., touchscreen display) that further support motion-based user input. For example, host computer 110, which may be a Windows computer that supports a first type of I/O devices (e.g., mouse, keyboard, and display), interprets I/O commands from client device 130, which may be a mobile device, such as an iPad, that supports a second type of I/O devices (e.g., touchscreen display) that further support finger gestures.

At a step 512, the operations of the interpreted I/O commands are returned from the application host computer, application server, or cloud server to the client device and rendered on the display thereof. For example, the operations of the interpreted I/O commands are returned from host computer 110 to client device 130 and rendered on the display of client device 130.

Various embodiments of the present invention allow for the method disclosed herein to be performed by an intermediary device (e.g., a cloud server), which may be associated with the host computer or reside elsewhere in the network (e.g., in the cloud). For example, a host computer of this disclosure may receive a request from a requesting client device, forward to a cloud server device, receive responsive data and forward to the client device, or visa-versa.

What is claimed:

1. A method for translating user input between devices having different input/output systems, the method comprising:

receiving user input from a user of a client device via a touchscreen, wherein the user input is associated with a touchscreen command and occurs at an identified location on the touchscreen;

transmitting the touchscreen command and the identified location from the client device to a host device, wherein the host device does not support touchscreen commands;

receiving at the client device an operation sent from the host device, the received operation associated with a set of one or more host commands being executed at a host display location corresponding to the identified touchscreen location, wherein the set is identified as equivalent to the touchscreen command based on a table stored in memory indicating that each of a plurality of client commands is equivalent to a corresponding set of one or more host commands; and rendering a display of the client device based on the received operation.

2. The method of claim 1, further comprising identifying the identified location based on at least a size of the touchscreen.

3. The method of claim 1, wherein the identified location corresponds to a control or field in a display of the host device.

4. The method of claim 1, further comprising storing client command library in memory, wherein the client command library comprises a plurality of touchscreen commands, each touchscreen command stored in association with the associated set of one or more host commands.

5. The method of claim 1, wherein the one or more host commands comprises mouse commands.

6. The method of claim 1, wherein the one or more host commands comprises keyboard commands.

7. The method of claim 1, wherein the one or more host commands are specific to an application executing on the host device.

8. The method of claim 1, wherein the user input comprises one or more gestures.

9. The method of claim 1, wherein the client device has a different operating system than the host device.

10. An apparatus for translating user input between devices having different input/output systems, the apparatus comprising:

a touchscreen that receives user input from a user of a client device, wherein the user input is associated with a touchscreen command and occurs at an identified location on the touchscreen;

a communication interface that:

transmits the touchscreen command and the identified location from the client device to a host device, wherein the host device does not support touchscreen commands, and receives an operation sent from the host device, the received operation associated with a set of one or more host commands being executed at a host display location corresponding to the identified touchscreen location, wherein the set is identified as equivalent to the touchscreen command based on a table stored in memory indicating that each of a plurality of client commands is equivalent to a corresponding set of one or more host commands; and a processor for executing the received operation, wherein execution of the received operation renders an updated display.

11. The apparatus of claim 10, wherein the processor executes further instructions to identify the identified location based on at least a size of the touchscreen.

12. The apparatus of claim 10, wherein the identified location corresponds to a control or field in a display of the host device.

13. The apparatus of claim 10, further comprising a memory that stores a client command library comprising a plurality of touchscreen commands, each touchscreen command stored in association with the associated set of one or more host commands.

14. The apparatus of claim 10, wherein the one or more host commands comprises mouse commands.

15. The apparatus of claim 10, wherein the one or more host commands comprises keyboard commands.

16. The apparatus of claim 10, wherein the one or more host commands are specific to an application executing on the host device.

17. The apparatus of claim 10, wherein the user input comprises one or more gestures.

18. The apparatus of claim 10, wherein the client device has a different operating system than the host device.

19. A non-transitory computer-readable storage medium, having embodied thereon a program executable by a processor to perform a method for translating user input between devices having different input/output systems, the method comprising:
- receiving user input from a user of a client device, wherein the user input is associated with a touchscreen command and occurs at an identified location on the touchscreen;
- transmitting the touchscreen command and the identified location to a host device, wherein the host device does not support touchscreen commands;
- receiving an operation sent from the host device, the received operation associated with a set of one or more host commands being executed at a host display location corresponding to the identified touchscreen location, wherein the set is identified as equivalent to the touchscreen command based on a table stored in memory indicating that each of a plurality of client commands is equivalent to a corresponding set of one or more host commands; and
- rendering a display of the client device based on the received operation.

* * * * *